United States Patent
Jones et al.

(10) Patent No.: US 6,201,409 B1
(45) Date of Patent: *Mar. 13, 2001

(54) HIGH PERFORMANCE PRODUCT TERM BASED CARRY CHAIN SCHEME

(75) Inventors: Christopher W. Jones, Pleasanton, CA (US); Jeffery Mark Marshall, Austin, TX (US)

(73) Assignee: Cypress Semiconductor Corp., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/499,816

(22) Filed: Feb. 8, 2000

Related U.S. Application Data (63) Continuation of application No. 09/093,651, filed on Jun. 9, 1998, now Pat. No. 6,034,546.

(51) Int. Cl.[7] .................................................. H03K 19/177
(52) U.S. Cl. ................................................. 326/39; 326/38
(58) Field of Search ........................................... 326/37–41

(56) References Cited

U.S. PATENT DOCUMENTS

| | | |
|---|---|---|
| 5,220,214 | 6/1993 | Pederson ................................ 326/41 |
| 5,245,226 | 9/1993 | Hodd, Jr. et al. ...................... 326/41 |
| 5,291,079 | 3/1994 | Goetting . | 
| 5,357,153 | 10/1994 | Chiang et al. . |
| 5,359,242 | 10/1994 | Veenstra ................................ 326/41 |
| 5,362,999 | 11/1994 | Chiang . |
| 5,481,206 | 1/1996 | New et al. ............................. 326/41 |
| 5,500,608 | 3/1996 | Goetting et al. . |

(List continued on next page.)

OTHER PUBLICATIONS

Altera Corporation, Flex 8,000 Programmable Logic Device Family, Data Sheet, Jun. 1996, ver. 8, pp. 91–115.

Cypress Semiconductor Corp., Flash 370i(tm) CPLDs, In System Reprogrammable Logic Simplifies Prototyping To Production Brochure '97.

Cypress Semiconductor Corp., PAL C 22V/10B/PAL C 22V10, Reprogrammable CMOS PAL(R) Device, Data Sheet, pp. 4–61 to 4–62.

Cypress Semiconductor Corp., Ultra 37000(tm) ISR(tm) CPLD Family, Data Sheet "Preliminary" Oct. 1995 revised Dec. 19, 1997.

Cypress Semiconductor Corp., Flash 370i(tm) ISR(tm) CPLD Family, Data Sheet, Oct. 1995 revised Dec. 19, 1997.

*Primary Examiner*—Jon Santamauro
*Assistant Examiner*—Don Phu Le
(74) *Attorney, Agent, or Firm*—Christopher P. Maiorana, P.C.

(57) ABSTRACT

A macrocell for a programmable logic device includes a carry generator for generating a carry input to the macrocell, the carry generator having an inverting input and at least one non-inverting input. A carry decoupler controls the carry generator and allows any macrocell to be decoupled from a next adjacent macrocell. An XOR gate having a first input is coupled to the output of the carry generator and a second input thereof is connected to a logic input to the macrocell. A register is coupled to the output of the XOR gate. A macrocell output selector includes a first input coupled to an output of the register and a second input coupled to the output of the XOR gate. A method for implementing a carry chain for macrocells within a product term based programmable logic device according to the present invention includes the steps of logically ANDing a carry input with a user-configurable input to produce an intermediate result; selecting one of two carry input product terms from a product term array based upon the intermediate result, the selected carry product term being a carry input to a current macrocell; propagating the carry input of the current macrocell to a next macrocell; and repeating the ANDing, selecting and propagating steps until a last macrocell of the chain is reached.

17 Claims, 8 Drawing Sheets

U.S. PATENT DOCUMENTS

| | | |
|---|---|---|
| 5,523,963 | 6/1996 | Hsieh et al. . |
| 5,546,018 | 8/1996 | New et al. . |
| 5,563,529 | 10/1996 | Seltzer et al. . |
| 5,581,199 | 12/1996 | Pierce et al. . |
| 5,583,450 | 12/1996 | Trimberger et al. . |
| 5,617,041 | 4/1997 | Lee et al. . |
| 5,682,107 | 10/1997 | Tavana et al. . |
| 5,705,938 | 1/1998 | Kean . |
| 5,796,268 * | 8/1998 | Kaplinsky .............................. 326/39 |
| 5,969,539 * | 10/1999 | Veytsman et al. ..................... 326/39 |
| 5,986,465 * | 11/1999 | Mendel .................................. 326/39 |

* cited by examiner

HIGH PERFORMANCE PRODUCT TERM BASED CARRY CHAIN SCHEME

This application is a continuation of Ser. No. 09/093,651 filed Jun. 9, 1998 U.S. Pat. No. 6,034,546.

BACKGROUND OF THE INVENTION

1. Field of the Invention

The invention pertains to the field of programmable logic devices. More particularly, the present invention pertains to the field of product term based simple and complex programmable logic devices, generally known as SPLDs and CPLDs, respectively.

2. Description of the Related Art

Figure 1:
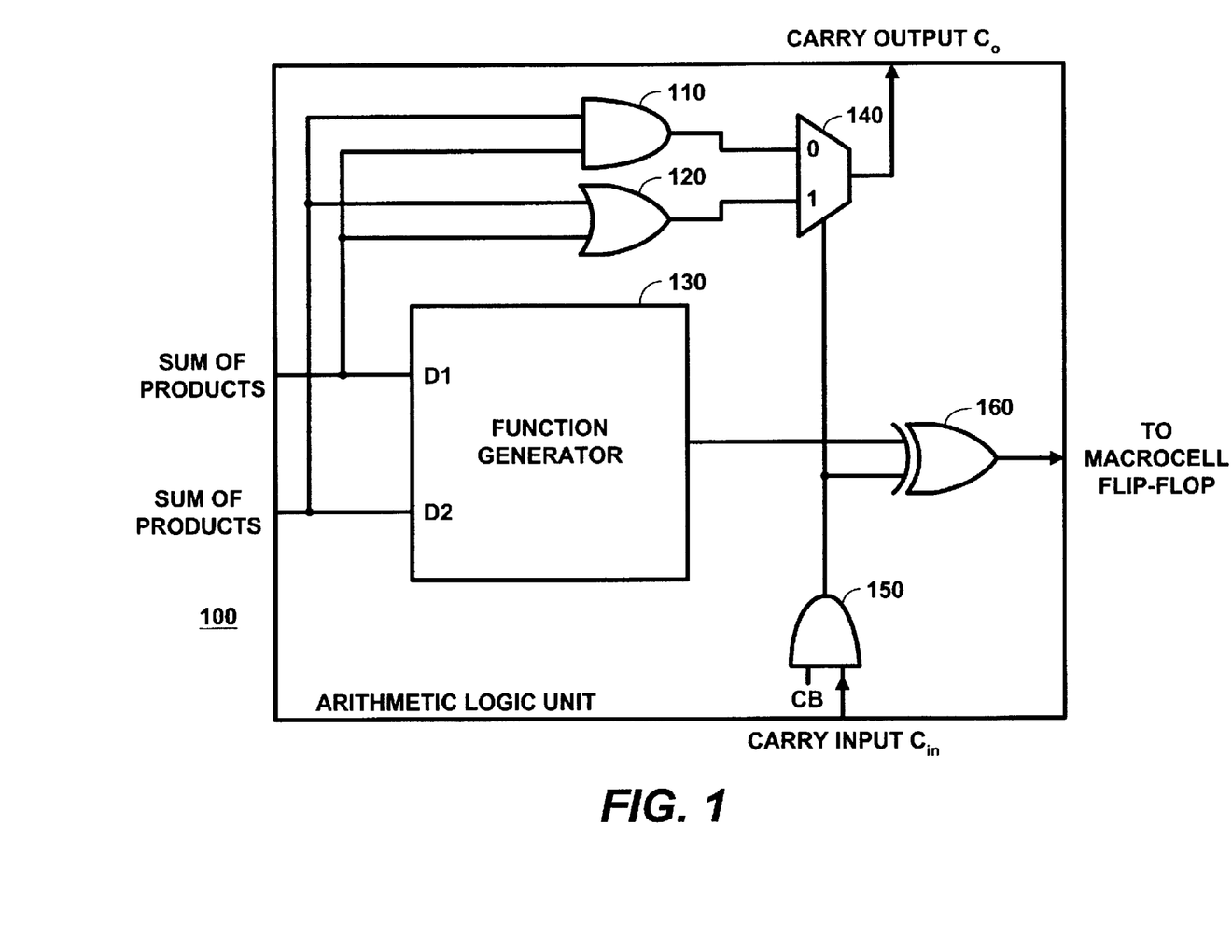
FIG. 1 shows an ALU of a conventional macrocell, including conventional carry chain circuitry.

FIG. 1 shows an Arithmetic Logic Unit (hereafter ALU) unit 100 of a conventional macrocell. The ALU 100 of FIG. 1 includes conventional carry chain circuitry. The ALU 100 includes a function generator 130 for carrying out arithmetic and logical operations upon the sum-of-product inputs D1 and D2. The carry chain of the conventional ALU 100 generates a Carry Output to the next macrocell from the AND gate 110, the OR gate 120 and the multiplexer referenced as MUX 140. The select line of MUX 140 is the output of the AND gate 150. The carry chain of FIG. 1 generates the Carry Output $C_O$ to the next macrocell (not shown) by implementing the equation:

$$C_O = (A_i * B_i) * / C_i + (A_i + B_i) * C_i \qquad \text{Eqn. 1}$$

where the "*" symbol indicates the logical AND operation, the "/" symbol indicates inversion and the "+" symbol indicates the logical OR operation. According to equation 1, the ANDed term $(A_i * B_i)$ is selected when the output of the AND gate 150 is low, and the ORed term $(A_i + B_i)$ is selected when the output of the AND gate 150 is high. The output of the AND gate 150 is the logical AND of the Carry Input $C_{in}$ of the current macrocell (the Carry Output $C_O$ from the previous macrocell in the chain) and a configuration bit CB. Therefore, as long as the configuration bit CB is high, the Carry Input $C_{in}$ will be propagated unchanged to the select line of the MUX 140. The output of the AND gate 150, together with the output of the function generator 130, is input to the XOR gate 160, the output of which is fed to the macrocell register (not shown).

However, the implementation of FIG. 1 suffers from a number of disadvantages, in terms of speed and arithmetic and logical functions. For example, the carry chain of FIG. 1 requires the Carry Input $C_{in}$ signal to be input to the AND gate 150, which $C_{in}$ signal to the macrocell is the Carry Output $C_O$ from the previous macrocell. To implement an adder that includes an initial Carry Input $C_{in}$ (other than a 0), the carry chain logic of the previous macrocell must be used. Indeed, setting the configuration bit CB to 0 insures that the select line to MUX 140 is 0. However, to propagate a carry bit of 1 to the select line of the MUX 140 requires that the configuration bit CB be set to 1 and the Carry Input $C_{in}$ signal from a previous macrocell (the Carry Output $C_O$ signal from the ALU of the previous macrocell) be available to the AND gate 150. Therefore, the ALU 100 of FIG. 1 and its associated carry chain is not capable of implementing an initial Carry Input $C_{in}$ (other than a 0) without utilizing the carry chain logic of a previous macrocell to generate its Carry Output $C_O$ signal, which is the Carry Input $C_{in}$ signal of the current macrocell Another disadvantage of the architecture of FIG. 1 concerns the function generator 130. Indeed, the presence of the function generator 130 in the ALU 100 adds an extra level of delay to the existing AND/OR plane. That is, to implement a full adder in the ALU 100 requires that the function generator 130 produce D1⊕D2, where the "⊕" symbol indicates the logical XOR operation. The XORed output of the function generator 130 is then input to the XOR gate 160, together with the output of the AND gate 150, which is the Carry Output $C_O$ signal from the previous macrocell. In the configuration of FIG. 1, to generate the D1⊕D2 term requires the inputs to the ALU 100 to pass through the function generator 130, and suffer propagation delay associated therewith. The delay through the function generator 130 is greater than through the logic gates 110 and 120, meaning that the D1⊕D2 term is not available until well after the Carry Input signal $C_{in}$ and the output of AND gate 150 are available.

The presence of the function generator 130 and the general architecture of the ALU 100 also present other disadvantages. Since one of the inputs to the XOR gate 160 is tied to the function generator 130, the XOR gate is not available for other logic functions. For example, the XOR gate 160 is not readily adaptable to T flip-flop synthesis without routing signals outside the ALU 100. Although an XOR gate is a potentially useful element to synthesize a number of logic functions, the XOR gate 160 of FIG. 1 is not available for such synthesis, because it is tied to the function generator 130 shown in FIG. 1 and because it is tied to the carry output from the previous macrocell. For example, the XOR gate 160 does not lend itself to general-purpose logic without routing signals through the function generator 130, or to such functions as polarity control.

One of the main disadvantages of CPLDs and other programmable logic devices that do not contain dedicated carry chain circuitry is the size and performance of the arithmetic function implementations. Arithmetic function implementations in CPLDs can be optimized for area and/or speed. These optimizations, however, are based only on optimizing the topology of the implementation. Without dedicated carry chain circuitry, arithmetic function implementations that are optimized for speed require a large amount of device resources. The required resources can grow to become a significant portion of the targeted device, thereby limiting the amount of resources for other portions of the design. Conversely, implementations that are optimized for area require fewer device resources, but are typically much slower than those optimized for speed. In summary, the coarse-grain nature of the CPLD does not allow for a good speed/area tradeoff when implementing arithmetic functions.

Table 1 gives examples of several different adders targeted to a CPLD that contains no dedicated targeted carry chain circuitry, such as the CY7C375I-125AC, manufactured by the assignee of the present invention, Cypress Semiconductor Corp. of San Jose, Calif.

TABLE 1

| Size[1] | Optimization | Product Terms | Macrocells | Array Passes | Speed |
|---|---|---|---|---|---|
| 8 Bit | Speed | 83 | 18 | 3 | 19.5 ns |
| 12 Bit | Speed | 136 | 47 | 3 | 19.5 ns |
| 16 Bit | Speed | 193 | 38 | 3 | 19.5 ns |
| 32 Bit | Speed | 461 | 78 | 3 | 19.5 ns |
| 8 Bit | Area | 80 | 12 | 4 | 25.0 ns |
| 12 Bit | Area | 126 | 18 | 6 | 36 ns |
| 16 Bit | Area | 172 | 24 | 8 | 47 ns |
| 32 Bit | Area | 356 | 48 | 16 | 91 ns |

Note 1: Assumes an n + 1 bit result for a carry output.

What is needed, therefore, is a dedicated carry chain method and architecture for a programmable logic device macrocell that does not require the carry chain logic of a previous macrocell to implement an initial Carry Input other than 0. Also needed are macrocells and a method of propagating a carry between macrocells of a product term based programmable logic device that do not depend upon a function generator to implement the carry chain, and that do not suffer from the propagation delay penalties associated with conventional arithmetic function implementations. Also needed is a carry chain method and macrocell architecture that are optimized for general-purpose logic, XOR input of generic product terms and polarity control without, however sacrificing speed or flexibility. There has also been a long felt need for a carry chain architecture and method for readily implementing a T flip-flop without having to feed back the Q output of the macrocell D flip-flop back through the central interconnect, thus using up inherently limited input bandwidth.

SUMMARY OF THE INVENTION

It is, therefore, an object of the present invention to provide a dedicated carry chain method and architecture for a programmable logic device macrocell that does not require the carry chain logic of a previous macrocell to implement an initial Carry Input other than 0. It is also an object of the present invention to provide a dedicated carry chain and a method of propagating a carry between macrocells of a product term based programmable logic device that do not depend upon a function generator to implement the carry chain, and that do not suffer from the propagation delay penalties associated with conventional arithmetic function implementations. Yet another object of the present invention is to provide a carry chain method and macrocell architecture that are optimized for general-purpose logic, XOR input of generic product terms and polarity control without, however sacrificing speed or flexibility. It is also an object of the invention to provide a carry chain architecture and method for readily implementing a T flip-flop without having to feed back the Q output of the macrocell D flip-flop back through the central interconnect.

In accordance with the above-described objects and those that will be mentioned and will become apparent below, a macrocell according to an embodiment of the present invention comprises:

a carry generator configured to generate a carry input to the macrocell, the carry generator having an inverting input and at least one non-inverting input;

a carry decoupler configured to control said carry generator;

an XOR gate having a first input coupled to an output of the carry generator and a second input connected to a logic input to the macrocell;

a register coupled to an output of said XOR gate; and a macrocell output selector having a first input coupled to an output of the register and a second input coupled to the output of the XOR gate.

According to further embodiments, the carry generator may comprise a first multiplexer of size x:1, wherein x is at least equal to 2 and wherein a select line of said first multiplexer is coupled to an output of the carry decoupler. The carry decoupler may comprise a carry input and a user configurable input. The carry decoupler may include either an AND gate or a third multiplexer having a user configurable select line. The output of the register may be fed back to one of the at least one non-inverting inputs. The macrocell output selector may comprise a multiplexer controlled by a user configurable select line. A second multiplexer controllable by a pair of user configurable inputs may be provided, the second multiplexer having a first input coupled to a first voltage supply source, a second input coupled to the output of the register, a third input coupled to the output of the carry generator and a fourth input coupled to a second voltage supply source.

According to another preferred embodiment, a method for implementing a carry chain according to the present invention comprises the steps of:

logically ANDing a first carry input with a user-configurable input to produce an intermediate result;

selecting one of at least two carry input product terms from a product term array based upon the intermediate result to provide a second carry input to a first macrocell; and propagating the second carry input to a second macrocell.

According to further embodiments, the step of repeating the ANDing, selecting and propagating steps until a last macrocell of the chain is reached may be carried out. The selecting step may include the step of converting one of the two carry product terms to a complement form. A step of decoupling a macrocell from the chain by setting the user configurable input of the macrocell to be decoupled to a predetermined state may be carried out. The selecting step may generate a carry input term for an $i^{th}$ sum term of a 1-bit ripple carry full adder, and the method may further comprise the step of providing logically ANDed $i^{th}$-1 sum operands as each of the two carry input product terms. The providing step may further include the step of taking a complement of one of the two logically ANDed $i^{th}$-1 sum operands. The selecting step may generate an XOR term of an n-bit parity tree, and further may comprises the step of providing a same $i^{th}$ bit XOR operand as the two carry input product terms, where i is less than n-1. The providing step further may include the step of taking a complement of one of the two same $i^{th}$ bit XOR operands. At a last macrocell in the parity tree, the selected carry product term may be XORed with a product term equal to a logical XOR of remaining most significant bits of the n-bit parity tree, to generate a final parity result.

According to a still further preferred embodiment, an n-bit ripple carry adder according to the present invention comprises n macrocells, each of said n macrocells including a carry input generator configured to generate a carry input for said macrocell and to propagate the carry input to a second macrocell; a carry decoupler configured to selectively couple or decouple any of said n macrocells from said second macrocell; means for generating a logical XOR of sum operands from a product term array and means for performing a logical XOR operation upon the carry input for said macrocell and the XOR of the sum operands to generate a sum output.

According to further embodiments, the carry input generator may include a multiplexer including an inverting input and at least one non-inverting input, the multiplexer being controlled at least by an output of the carry decoupler. The carry decoupler may include one of a logical AND gate and a multiplexer, each having at least one user configurable input. An $n+1^{th}$ macrocell may be provided, the $n+1^{th}$ macrocell generating a final carry output.

BRIEF DESCRIPTION OF THE DRAWINGS

For a further understanding of the objects and advantages of the present invention reference should be made to the following detailed description, taken in conjunction with the accompanying figures, in which.

DESCRIPTION OF THE PREFERRED EMBODIMENTS

To implement a full adder requires the implementation of the equation:

$$S_i = (A_i \oplus B_i) \oplus C_i \qquad \text{Eqn. 2}$$

The truth table for the full adder operation is shown in Table 2. In Table 2, $A_i$ and $B_i$ are the sum operands, $C_i$ is the carry in, $C_o$ is the carry out and Si is the sum output.

TABLE 2

| $A_1$ | $B_1$ | $C_1$ | $C_o$ | $S_1$ |
|---|---|---|---|---|
| 0 | 0 | 0 | 0 | 0 |
| 0 | 0 | 1 | 0 | 1 |
| 0 | 1 | 0 | 0 | 1 |
| 0 | 1 | 1 | 1 | 0 |
| 1 | 0 | 0 | 0 | 1 |
| 1 | 0 | 1 | 1 | 0 |
| 1 | 1 | 0 | 1 | 0 |
| 1 | 1 | 1 | 1 | 1 |

Therefore, $$C_o = A_i*B_i + Ai*C_i + B_i*C_i \qquad \text{Eqn. 3}$$

In contrast to conventional carry chains, instead of generating a Carry Output $C_o$ to the next macrocell in the chain, the present invention generates the Carry Input $C_i$ to the current macrocell. Moreover, instead of ANDing and ORing the product terms using logic gates such as shown at references 110 and 120 in FIG. 1, the present invention transforms the ORed term using the theorem commonly known as DeMorgan's law, which states that:

$$A_i + B_i = /(/A_i*/B_i) \qquad \text{Eqn. 4}$$

Figure 2:
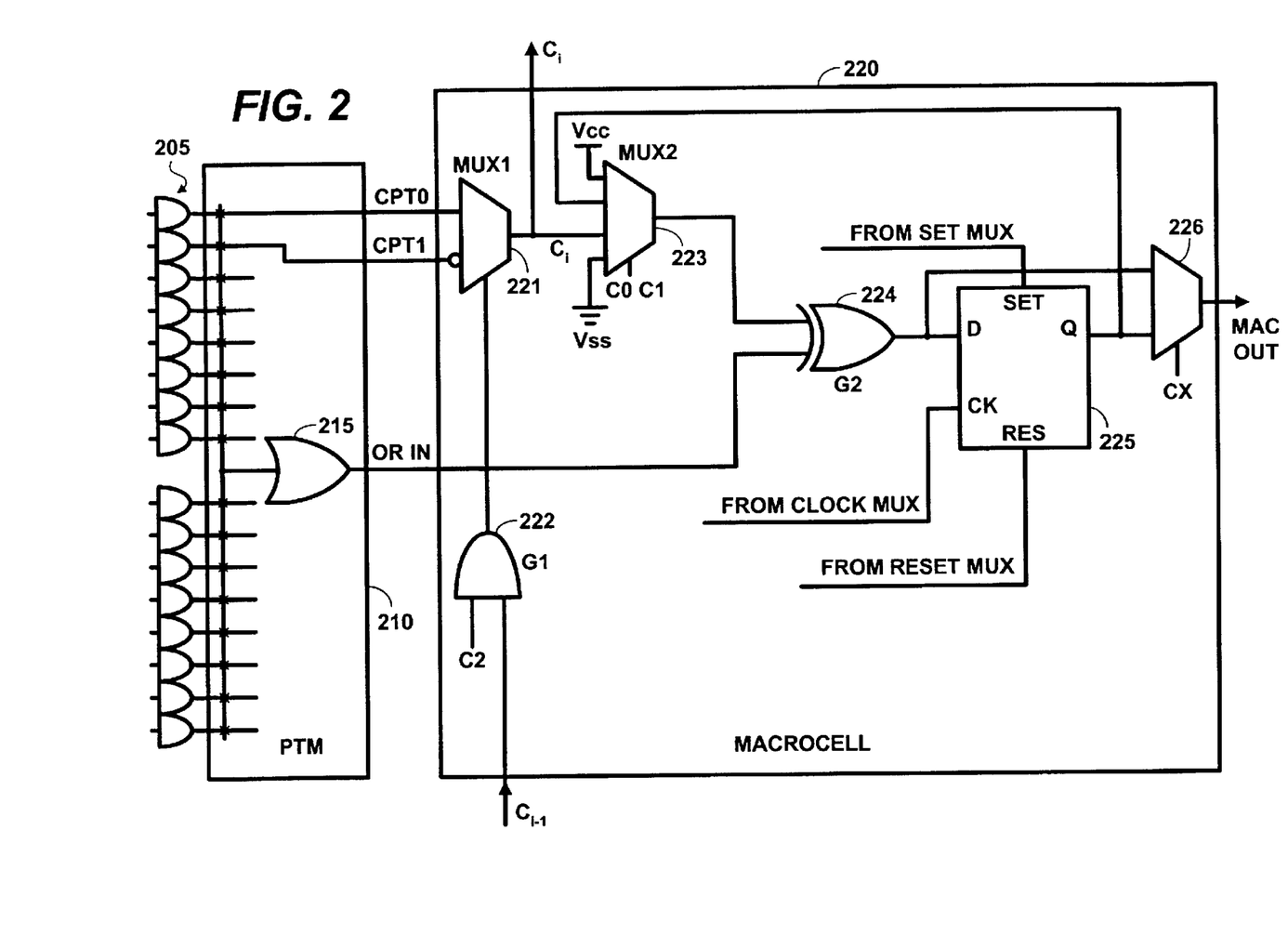
FIG. 2 shows an embodiment of the carry chain and macrocell architecture according to the present invention.

Taken collectively, generating the Carry Input $C_i$ and generating the ORed term by applying DeMorgan's law results in a device having a more efficient structure, greater functionality and increased speed, as described herein with respect to FIG. 2.

FIG. 2 shows an embodiment of the present invention. The Carry Product Term 0 (hereafter CPT0) and the Carry Product Term 1 (hereafter CPT1) are generated from the programmable AND (product term) array, referenced by 205. The CPT0 and CPT1 inputs are connected directly to 2 product terms in the product term array 205 and do not come from the Product Term Matrix (hereafter PTM) 210. However, CPT0 and CPT1 are inputs to the PTM 210 and may be used by the PTM 210 to form logic equations in certain configurations of the carry chain according to the present invention. The product terms CPT0 and CPT1, together with the multiplexer 221 (hereafter MUX1) generate the Carry Input $C_i$ to the current macrocell 220, as opposed to the Carry Output signal $C_o$ destined for the next macrocell in the chain. CPT0 and CPT1 are defined as follows:

$$CPT0 = A_{i-1}*B_{i-1} \qquad \text{Eqn. 5}$$

$$CPT1 = /A_{i-1}*/B_{i-1} \qquad \text{Eqn. 6}$$

The $/A_{i-1}*/B_{i-1}$ term of CPT1 is readily available, as the true and complement of all inputs are available to the AND array 205. The output ORin of the fixed 16-input OR gate 215 of the AND array 205 is defined as:

$$ORin = (A_i*/B_i) + (/A_i*B_i) \qquad \text{Eqn. 7}$$

MUX1 221 is controlled, at its select line, by the output of the logic gate 222 (hereafter G1). G1 may, as shown in FIG. 2, be a two-input AND gate. The carry input generated for the previous macrocell, namely $C_{i-1}$, forms one input to G1, whereas a configuration bit C2 forms another input thereto. The configuration bit C2, as are the configuration bits C0, C1, Cx and all other configuration bits referred to herein, may be programmable by a high level descriptive language, such as VERILOG® or VHDL.

As MUX1 221 takes the complement of its CPT1 input, the output of MUX1 221, (the Carry In signal $Cin_i$ for the current $i^{th}$ macrocell) is defined as:

$$Cin_i = MUX1_{outi} = CPT0_i*/C_{i-1} + /CPT1_i*C_{i-1} \qquad \text{Eqn 8}$$

meaning that the $CPT0_i$ input is output from MUX1 221 when the carry $C_{i-1}$ generated by the previous macrocell is 0 and $/CPT1_i$ is output from the MUX1 221 when the carry $C_{i-1}$ generated by the previous macrocell is 1, the configuration bit C2 being set to 1. MUX1 221, therefore, may be thought of as the carry generator for the current sum bit. Substituting for the Boolean expressions for $CPT0_i$ and $CPT1_i$ yields:

$$MUX1_{outi} = A_{i-1}*B_{i-1}*/C_{i-1} + /(/A_{i-1}*/B_{i-1})*C_{i-1} \qquad \text{Eqn 9}$$

$$MUX1_{outi} = A_{i-1}*B_{i-1}*/C_{i-1} + (A_{i-1}+B_{i-1})*C_{i-1} \qquad \text{Eqn 10}$$

$$MUX1_{outi} = A_{i-1}*B_{i-1}*/C_{i-1} + A_{i-1}*C_{i-1} + B_{i-1}*C_{i-1} \qquad \text{Eqn 11}$$

which simplifies to:

$$MUX1_{outi} = A_{i-1}*(B_{i-1}*/C_{i-1} + C_{i-1}) + B_{i-1}*C_{i-1} \qquad \text{Eqn 12}$$

$$MUX1_{outi} = A_{i-1}*(B_{i-1} + C_{i-1}) + B_{i-1}*C_{i-1} \qquad \text{Eqn 13}$$

$$MUX1_{outi} = A_{i-1}*B_{i-1} + A_{i-1}*C_{i-1} + B_{i-1}*C_{i-1} \qquad \text{Eqn 14}$$

Equation 14 is a three-input majority function that is the Carry Input for the macrocell configured for the sum bit $S_i$. The implementation of the full adder for sum bit $S_i$ in a single macrocell is different than a traditional full adder macrocell since the Carry In signal is generated for the local sum instead of the next sum in the adder chain.

Recalling that the sum term $S_i$ is equal to $(A_i \oplus B_i) \oplus C_i$ from Eqn. 2, the Carry Input signal $Cin_i$ is given by Eqn 14, whereas the $(A_i \oplus B_i)$ term is given by $(A_i*/B_i) + (/A_i*B_i)$, which is the output ORin of the OR gate 215, from Eqn. 7. Thus, $$S_i = [(A_i*/B_i) + (/A_i*B_i)] \oplus C_i \qquad \text{Eqn. 15}$$

which may be rewritten as $$S_i = /A_i*/B_i*C_i + /A_i*B_i*/C_i + A_i*/B_i*/C_i + A_i*B_i*C_i \qquad \text{Eqn. 16}$$

which may be confirmed by inspection of Table 2.

Turning back now to FIG. 2, the output of MUX 1 221, the Carry In signal $C_i$ for the local sum, may be connected to one of the four inputs of multiplexer 223 (hereafter MUX2). Another input to MUX2 may be connected to Vss, which may be, for example, tied to the ground potential. Yet another input to MUX2 may be connected to a Vcc voltage source. The select line of MUX2 may be controlled by configuration bits C0 and C1. The output of MUX2 may be tied to one input of a two-input XOR gate 224 (hereafter G2). The other input of G2 may be connected to the signal ORin output from OR gate 215 of PTM 210. Therefore, when the configuration bits C0 and C1 select the output of MUX1 to be output from MUX2, the output of G2 is the sum $S_i=(A_i \oplus B_i) \oplus C_i = /A_i*/B_i*C_i + /A_i Bi*/C_i + A_i*/B_i*/C_i + A_i*B_i*C_i$ of Eqn. 16. The output of G2 is connected to the input of register 225, which may be, as shown in FIG. 2, a D flip-flop. The set input SET, clock input CK and reset input RES of the register 225 may be controlled by the outputs of respective multiplexers (not shown). The Q output of the D flip-flop 225 may be connected to a macrocell output selecting multiplexer 226. The macrocell output selecting multiplexer 226 may also have an output connected directly to the output of G2. Depending upon the state of user programmable configuration bit Cx, the select line of the macrocell output selecting multiplexer 226 will cause the macrocell 220 to output either the Q output of D flip-flop 225 or the output of G2. When the output of G2 is selected as the output of the macrocell, the D flip-flop may be effectively bypassed, resulting in a combinatorial output for the macrocell 220.

One distinct advantage of the embodiment of the present invention shown in FIG. 2 is the ease with which a T flip-flop may be synthesized from the D flip-flop 225 without, however, routing the Q output of the D flip-flop 225 out of the macrocell and back through a central interconnect. Indeed, as shown in FIG. 2, the Q output of the D flip-flop 225 may be fed back to an input of MUX2, thereby remaining local to the macrocell 220. Therefore, by appropriately setting configuration bits C0 and C1, the Q output of register 225 may be input to G2 and fed back to the D input of the D flip-flop 225. Such a synthesized T register equation does not reduce the number of product terms available for other logic. Indeed, since one of the inputs to MUX2 is the macrocell register 225 output, a T flip-flop may be realized without having to use a product term to route the register output to the input of the XOR gate G2. Without this advantageous feature of the present invention, the carry chain would have to be configured such that CPT0 is an input to G2 and the equation for CPT0 would simply be the flip-flop feedback. This saves both product terms and inputs.

Another advantage of the carry chain and macrocell architecture of FIG. 2 is that one input to G2 may be the product term CPT0. Indeed, the macrocell 220 may be configured such that the CPT0 product term is an input to the XOR gate G2. This allows G2 to be used for general logic, such as a parity tree, as well as allowing the synthesis software to implement T and T bar equations.

In contrast to conventional carry chains, the carry chain according to the present invention requires only two product terms to implement and may be decoupled from G2. A beneficial consequence of this product term economy is that when logic (such as a parity tree) is buried in a logic block using the carry chain, there are still many product terms remaining to implement other logic in the macrocells.

Table 3 sets forth one possible combination of the MUX2 configuration bits C0 and C1, and the resultant inputs to G2.

TABLE 3

| C1 | C0 | G2 Input |
|----|----|----------|
| 0 | 0 | Vcc |
| 0 | 1 | Macrocell register Q output |
| 1 | 0 | MUX1 output |
| 1 | 1 | Vss or ground |

Another advantage of the architecture of FIG. 2 is that the carry chain may be used for =logic that is separate from the associated macrocell, as MUX2 223 allows the carry chain to be removed from the input to G2 in the macrocell 220. Indeed, by setting configuration bits COC1 to 00, 01 or 11, respectively, the carry input generated by MUX1 is not propagated through MUX2 to the input of G2. This allows logic such as a magnitude comparator or a parity tree to be implemented with the carry chain logic and still allow other logic to be implemented in the macrocells that do not produce the final output. In some cases, such as the magnitude compare operation, this feature is limited due to the number of array inputs that remain after the comparator has been implemented. For example, for a 16-bit magnitude comparator, 32 array inputs are used for the comparator, leaving only 4 array inputs for other logic, given a 36 input array. In the case of parity trees, however, a sufficient number of array inputs remain that the macrocells may be used for logic other than the carry chain.

In FIG. 1, the output of the AND gate 150 is tied to the XOR gate 160, making segmentation of one macrocell from the next adjacent previous macrocell difficult. According to the present invention, however, the carry chain may be segmented at any macrocell. Indeed, by using configuration bit C2 of the carry decoupler circuit G1, the carry chain may be segmented at any macrocell. By setting configuration bit C2 to 1 in the embodiment shown in FIG. 2, the output of G1 follows the carry input to the $C_{i-1}$ input. Alternatively, by resetting C2 to 0, the output of G1 remains at 0 and the output thereof does not follow the $C_{i-1}$ input. This allows adders, subtractors and any other logic function that uses the carry chain to begin or end at any macrocell in the device. The carry decoupler circuit G1 also allows a macrocell to be isolated from the previous carry chain so that it is not affected by it.

Further advantages of the architecture of the carry chain and macrocell according to the present invention include, for example, the ability to implement an initial carry without the need for an additional macrocell carry output. Moreover, the absence of a function generator (such as function generator 130 in FIG. 1) in the carry path results in a faster and smaller carry chain. Indeed, one important advantage of the present invention over conventional devices is the ability to implement higher performance arithmetic functions using a reduced number of device resources. Table 4 shows the device resources and total propagation delays for several differently sized ripple carry adders that utilize the carry chain according to the present invention. Table 4 assumes that the targeted device is the Cypress Semiconductor Corp. CY7C375I-125AC, with the addition of the carry chain according to the present invention, and a carry chain propagation delay of 250 ps for each bit.

TABLE 4

| Size[1] | Product Terms | Macrocells | Carry Chains | Speed |
| --- | --- | --- | --- | --- |
| 8 Bit | 34 | 9 | 9 | 10.75 ns |
| 12 Bit | 50 | 13 | 13 | 11.75 ns |
| 16 Bit | 66 | 17 | 17 | 12.75 ns |
| 32 Bit | 130 | 33 | 33 | 16.75 ns |

Note [1]: Assumes a N + 1 bit result for a carry output.

Therefore, utilizing the carry chain of the present invention, full ripple carry adders may be implemented that are faster and that utilize fewer device resources than CPLDs that do not include the dedicated carry chain circuitry according to the present invention.

One mode of operation of the carry chain according to the present invention will next be described with reference to FIG. 3, which shows a portion of a 16-bit ripple carry adder implementing the macrocell structure shown in FIG. 2. The ripple carry adder of FIG. 3 takes $A_0$–$A_{15}$ as inputs bits and outputs sum bits $S_0$–$S_{15}$. For simplicity and ease of illustration, however, only the least significant 4 bits $A_0$–$A_3$; $B_0$–$B_3$ and $S_0$–$S_3$ of the 16-bit ripple carry adder are shown in FIG. 3.

Figure 3:
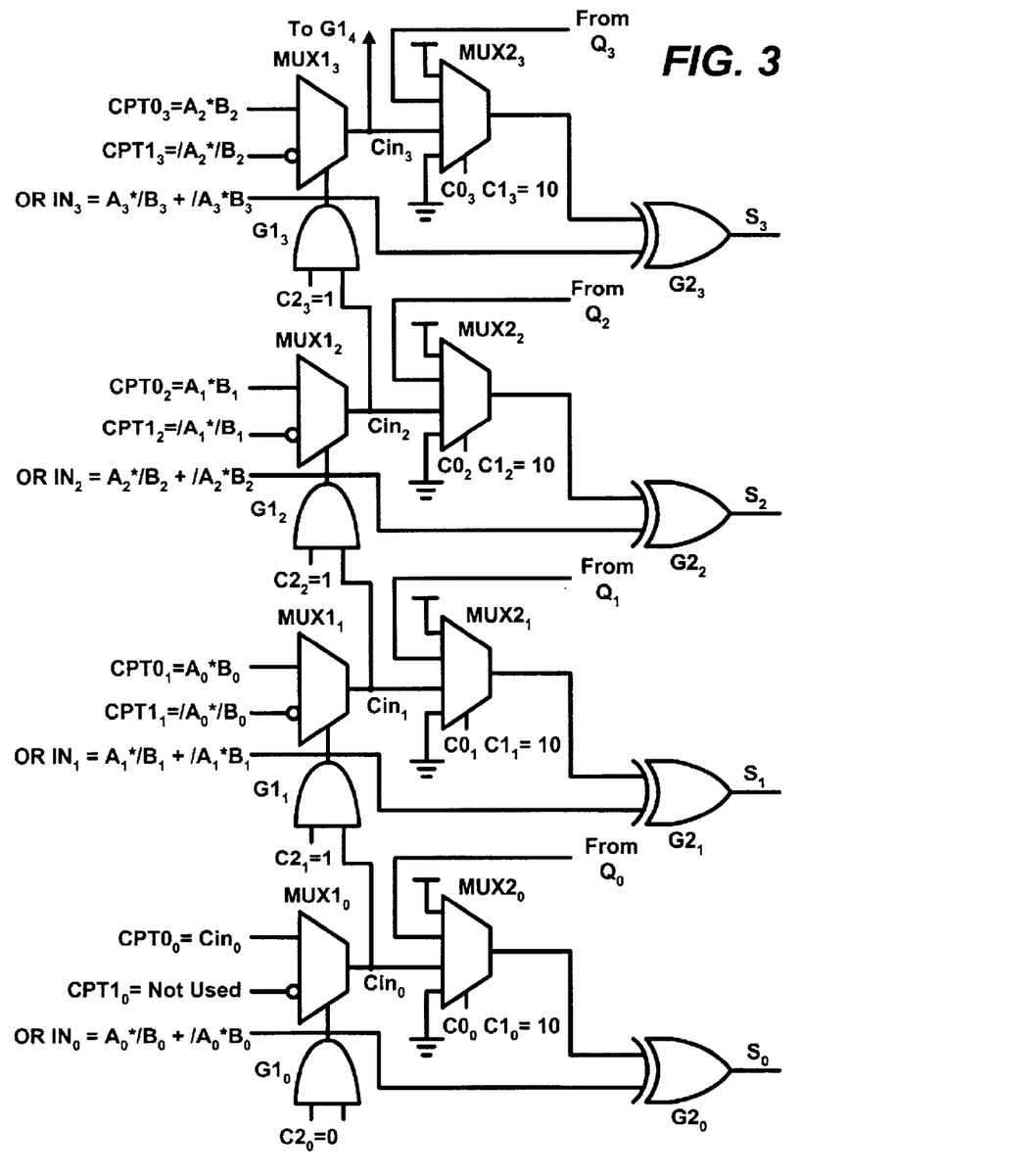
FIG. 3 shows the first 4 bits of an 16-bit ripple carry adder incorporating the dedicated carry chain according to an embodiment of the present invention.

The 16-bit ripple carry full adder includes 16 macrocells, four of which are shown in FIG. 3. Each of the macrocells shown in FIG. 3 is similar to the macrocell 220 shown in FIG. 2. However, the register 225 and the macrocell output selector multiplexer 226 have not been included in any of the macrocells in FIG. 3 for clarity. For the purposes of FIG. 3, it is assumed that the configuration bit CX has been set so as to select the output of G2 and to bypass the register 225. For the first sum operand bits $A_0$ and $B_0$, the first configuration bit $C2_0$ is set to 0, so as to cause $MUX1_0$ to always select $CPT0_0$, which has been set to $Cin_0$, the initial carry into the sum. Since $CPT0_0$ is always selected by $MUX1_0$, $CPT1_0$ is not used. $ORin_0$ is set to the value indicated in FIG. 3, which is equivalent to the XOR operation $A_0 \oplus B_0$. Configuration bits $C0_0$ and $C1_0$ are set to 1 and 0, respectively, so as to cause $MUX2_0$ to select the output of $MUX1_0$ as its output. Thus, $G2_0$ performs the XOR operation ($ORin_0$ ED Cin) and outputs the least significant sum bit $S_0$.

The output of $MUX1_0$, $Cin_0$, is then propagated to the select line of $MUX1_1$, as $C2_1$ is set to 1, causing the output of $G1_1$ to follow the output of $MUX1_0$. To generate $Cin_1$, the carry for $S_1$, $A_0$ and $B_0$ are used, as indicated by Eqn. 14. Therefore, $CPT0_1$ equals $A_0*B_0$ and $CPT_1$ equals $/A_0*/B_0$. $MUX1_1$, therefore, outputs the carry in $Cin_1$ for sum bit $S_1$. $MUX2_1$ is configured to output $Cin_1$, the output of $MUX1_1$. Thereafter, $G2_1$ outputs sum bit $S1_1$, the result of the logical XOR operation on $ORin_1$ and $Cin_1$. Sum bits $S_2$ and $S_3$ are obtained in a similar manner, as are the remaining sum bits $S_4$ to $S_{15}$, not shown in FIG. 3.

For any given adder configuration, there is an initial carry input to the adder and a final carry output. The initial carry input, such as $Cin_0$ in FIG. 3, may be a constant, 0 or 1, or may be a variable input. The carry chain according to the present invention, as illustrated in FIGS. 2 and 3, has the ability to accommodate each of these carry input boundary conditions. For a constant initial carry input of 0 or 1, configuration bit $C2_0$ is set to 0 and $CPT0_0$ is programmed to be a constant 0 or 1. For a variable initial carry input, $C2_0$ is again set to 0 and $CPT0_0$ selects the variable input.

The final carry output of an adder, according to the present invention, may be either used or unused by the next macrocell. If the final carry out is unused, then the output of the last MUX1 ($Cin_{15}$, the output of $MUX1_{15}$ in the case of the example of FIG. 3) is simply not used by the next macrocell. If the final carry out is needed for other logic within the device, the next macrocell will use the carry chain logic to produce the final carry out. The final carry out will then be routed to the macrocell output via G2 and made available to the remaining logic in the device. To do this, the ORin input to the macrocell is forced to 0 by using a single product term from the PTM that is set to 0.

G1, according to the present invention, may be considered to be a carry decoupler, as setting configuration bit C2 to 0 within any macrocell will decouple that macrocell from the next adjacent macrocell by interrupting the propagation of the carry to the next macrocell. Decoupling one macrocell from the next by setting C2 to 0 also has the added benefit of permitting the use of G2 and the product term CPT0 for additional logic synthesis.

A full adder, as shown in FIG. 3, however, is not the only logic operation that may be carried out utilizing the carry chain according to the present invention. Other operations that may be implemented include a subtractor, a magnitude comparator and a parity tree. Indeed, the carry chain of FIG. 3 may easily implement a subtractor by using 2's complement arithmetic, by inverting the inputs of the value to be subtracted and setting the initial carry in to 1, or by implementing a true subtractor cell that creates the difference and the borrow in. The subtractor may also implement a magnitude comparison using only the borrow out. For example, if A-B is to be implemented, then the borrow out can be used to determine if $A \geq B$ (borrow out=0) or if A<B (borrow out=1).

Figure 4:
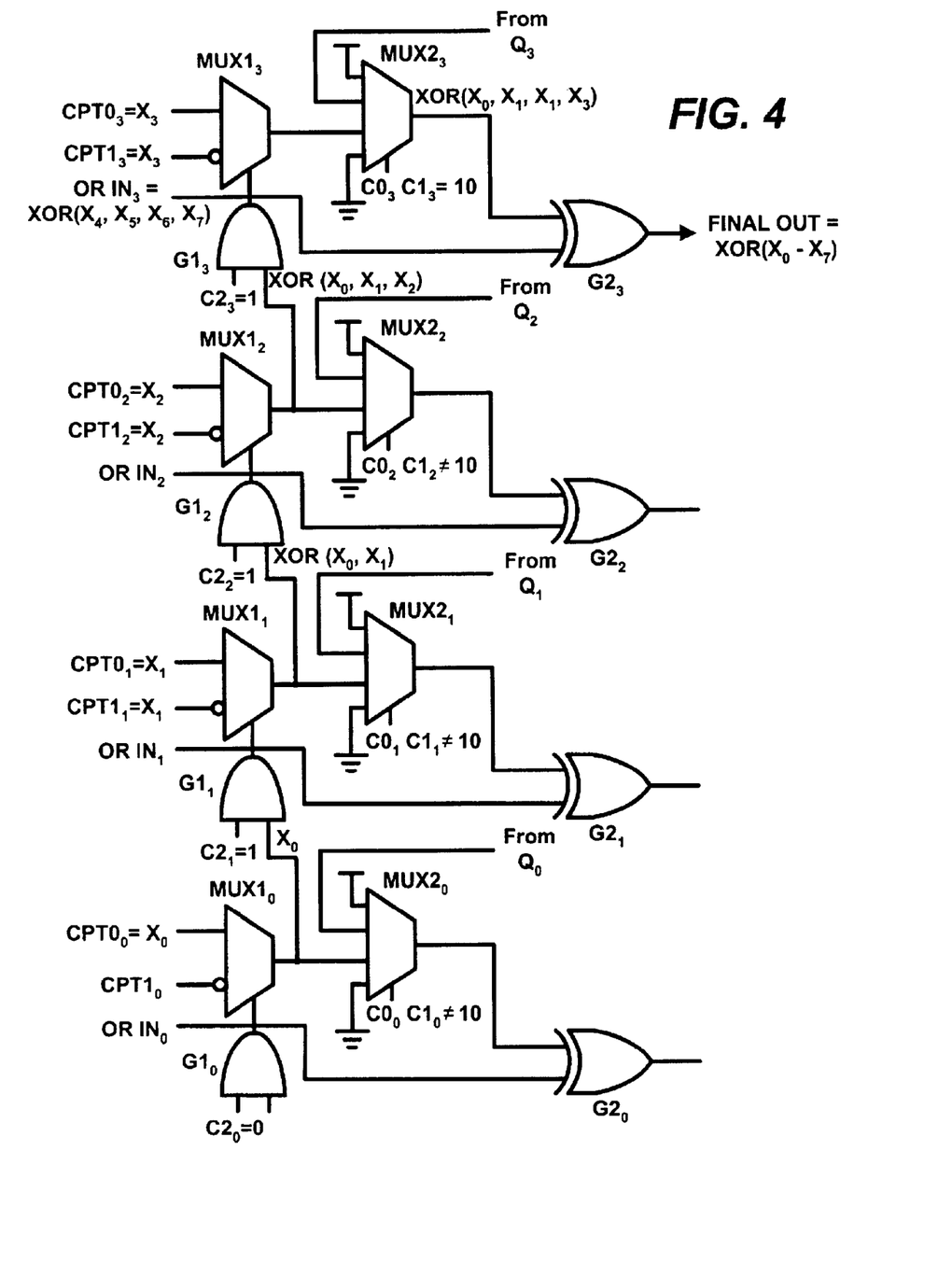
FIG. 4 shows an 8-bit parity tree according to another embodiment of the present invention.

Another logic function that may be implemented with the carry chain according to the present invention is a parity tree. An embodiment of an 8-bit parity tree according to the present invention is shown in FIG. 4. As shown therein, $C2_0$ is programmed to 0, to insure that $MUX1_0$ selects the $CPT0_0$ input, which is $X_0$, the first bit of the 8-bit word to be parity checked. $CPT1_0$ is not used. The configuration bits $C0_0$ and $C1_0$ of $MUX2_0$ are programmed to any value except 10, to insure that $G2_0$ does not receive the $X0_0$ input. This leaves the $ORin_0$ and $G2_0$ free to implement other logic, as desired. Therefore, the $X_0$ input is propagated to $G1_1$, and to the select line of $MUX1_1$, as the configuration bit $C2_1$ has been programmed to 1. The output of $MUX1_1$ is the logical XOR of $X_0$ and $X_1$, as $X_1$ is present on both inputs of $MUX1_1$. As is the case with the macrocell of FIG. 2 and the ripple carry adder of FIG. 3, multiplexers $MUX1_{0-3}$ include a true input and a complement input.

Therefore, the input to $G1_2$ is equal to XOR ($X_0$, $X_1$). Thereafter, $X_2$ is input to both the true and complement (non-inverting and inverting) inputs of $MUX1_2$, to produce XOR ($X_0$, $X_1$, $X_2$) at the input of $G1_3$. $ORin_{1-2}$ are unused, and available for other logic, as desired, as are $G2_{1-2}$. As $CPT0_3$ and $CPT1_3$ are each $X_3$, the output of $MUX1_3$ is the function XOR ($X_0$, $X_1$, $X_2$, $X_3$), which is presented to $G2_3$, as the configuration bits $C0_3$ and $C1_3$ of $MUX2_3$ are programmed to 1 and 0, respectively. $ORin_3$, unlike $Orin_{0-2}$, carries the XOR of the remaining most significant bits, namely bits $X_4$, $X_5$, $X_6$ and $X_7$. Therefore, the output of $G2_3$ is the output of the parity tree, namely XOR ($X_0$–$X_7$). In the parity tree shown in FIG. 4, each carry chain contributes one input to the parity tree and the last macrocell (including elements $G1_3$, $MUX1_3$, $MUX2_3$ and $G2_3$) implements a 4-input XOR with 8 product terms and then uses the XOR gate G2 for the last stage in the parity tree. In general, an n-bit parity tree may be implemented in n-1 carry chains. Several alternative embodiments of the carry chain architecture of FIG. 2 are shown in FIGS. 5–8. In FIGS. 5–8, the PTM 210, the AND array 205, and the NOR gate 215 of FIG. 2 are omitted for clarity. Circuit elements in FIGS. 5–8 having exact counterparts in FIG. 2 have been labeled with the same reference numbers and the detailed descriptions thereof are also omitted.

Figure 5:
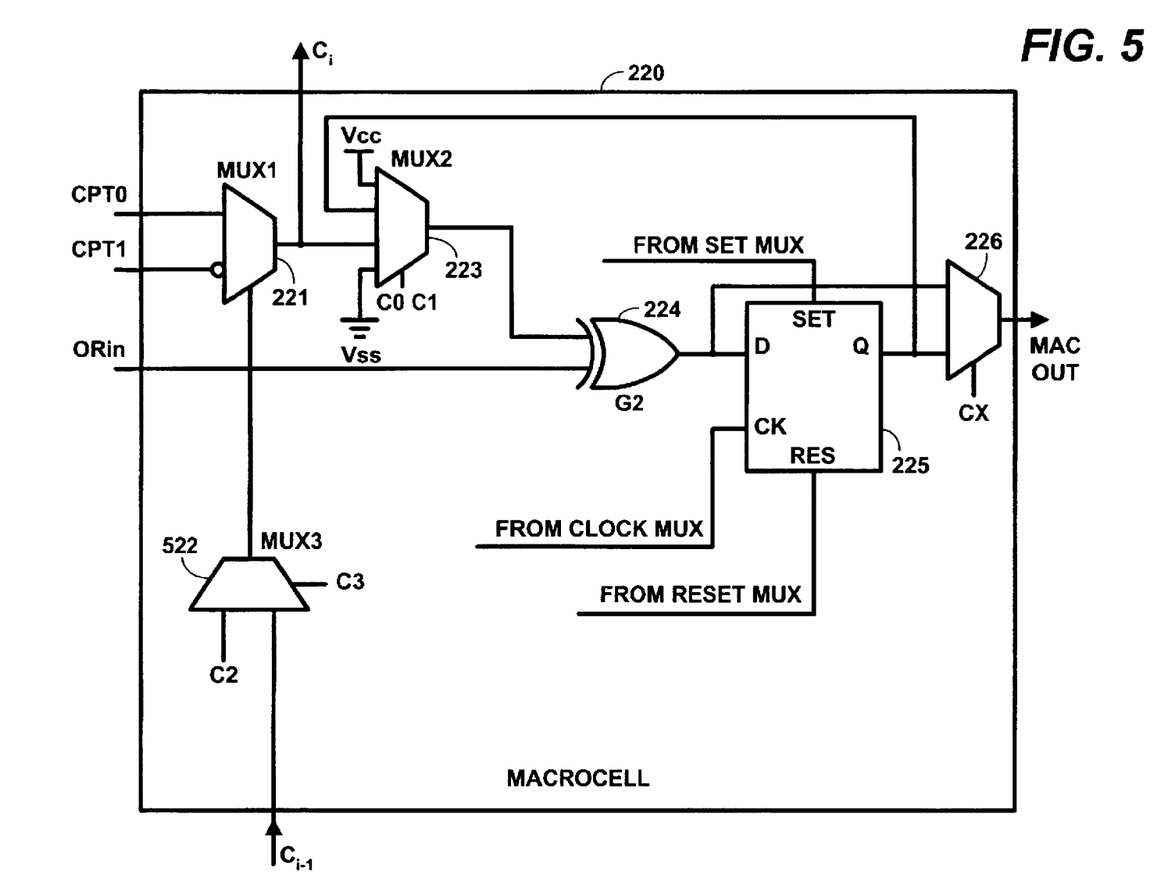
FIG. 5 shows a further embodiment of the carry chain and macrocell architecture according to the present invention.

FIG. 5 shows a first alternative embodiment of the carry chain architecture according to the present invention. In FIG. 5, the AND gate 222 of FIG. 2 has been replaced by a multiplexer, labeled MUX3 522. MUX3 takes as inputs the carry in generated from the previous macrocell or an initial, user definable carry in value. Configuration bit C2 is also input to MUX3, which is controlled by a programmable configuration bit C3 at its select line. Using MUX3, when the carry chain is used simply to add a product term to one input of G2, either product terms CPT0 or CPT1 may be used, depending upon the configuration bits C2 and C3. This configuration allows for a true or complement product term to be selected as an input to the XOR gate. However, MUX 3 is larger than AND gate 222 of FIG. 2 and the embodiment of FIG. 5 requires the additional configuration bit C3.

Figure 6:
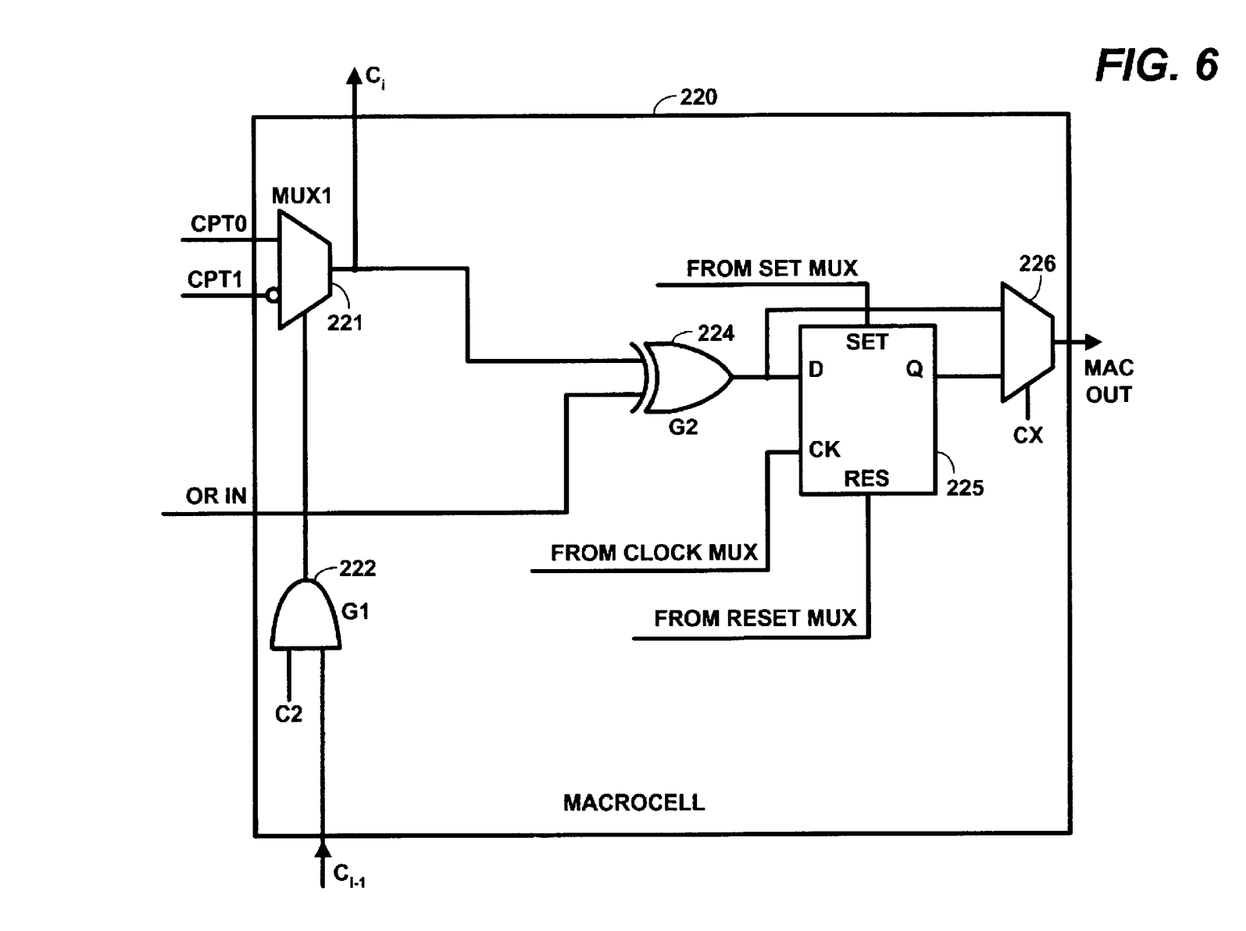
FIG. 6 shows yet another embodiment of the carry chain and macrocell architecture according to the present invention.

FIG. 6 shows a second alternative embodiment of the carry chain according to the present invention. In FIG. 6, MUX2 223 of FIG. 2 has been removed from the macrocell 220, resulting in a simpler, smaller and faster macrocell. In the macrocell architecture shown in FIG. 6, carry product term CPT0 must be dedicated to the macrocell and cannot be used by the PTM 210. Carry product term CPT1 may be used by the PTM 210 by setting configuration bit C2 to 0, thus preventing MUX1 from having the ability to select CPT1. However, if such a carry chain is used for logic such as a magnitude comparator or a parity tree, then the macrocell is unavailable for other logic.

Figure 7:
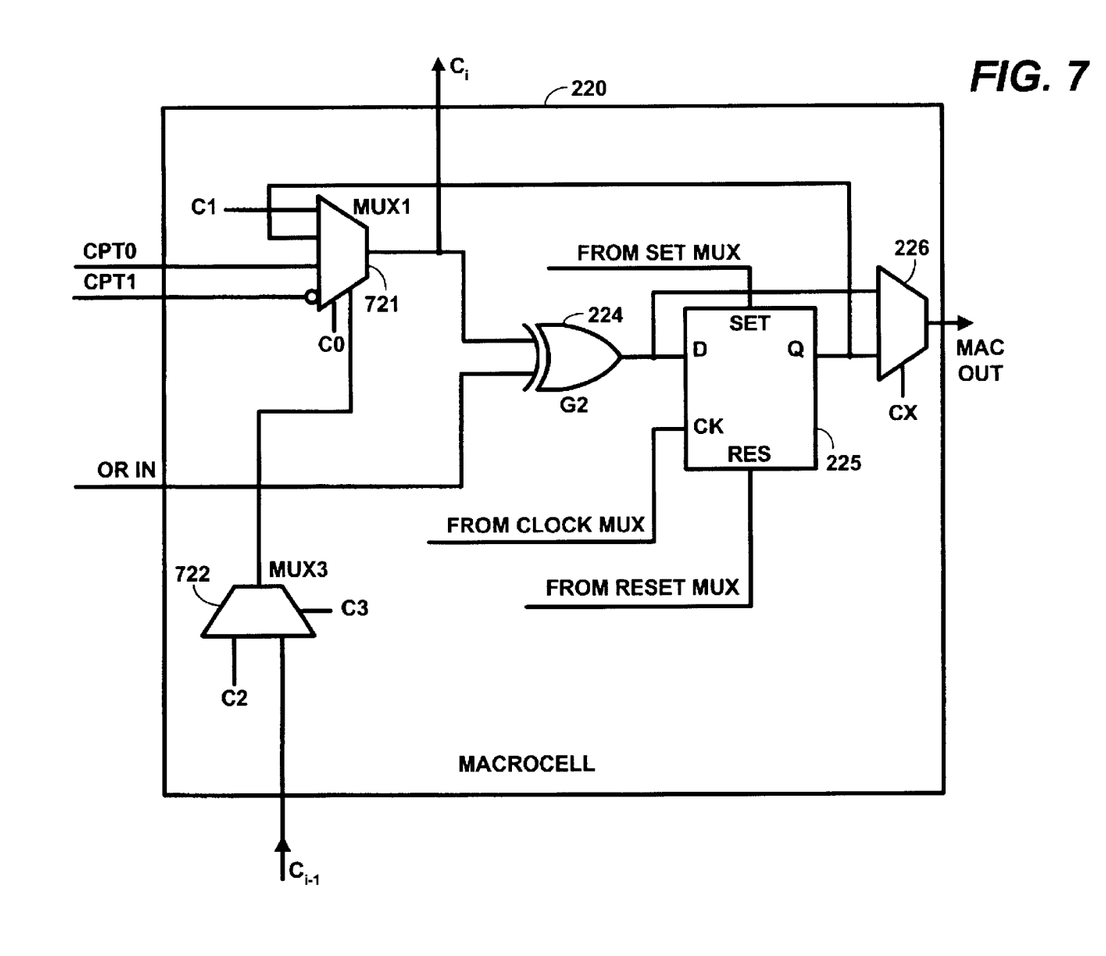
FIG. 7 shows a still further embodiment of the carry chain and macrocell architecture according to the present invention.

FIG. 7 shows yet another embodiment of the carry chain according to the present invention. In FIG. 7, MUX2 shown at reference numeral 223 in FIG. 2 has been combined with MUX1. MUX1 of FIG. 7, referenced by numeral 721, includes one true input for CPT0, one complement input for CPT1, one input from the output of register 225 and another input for a programmable configuration bit C1. Also, the carry decoupler circuit 722, shown as a logical AND gate in FIG. 2, is a multiplexer similar to element 522 in FIG. 5. MUX1 721, although larger than MUX1 221 of FIG. 2, occupies a smaller area than do MUX1 221 and MUX2 223 combined, resulting in saved area and potentially increased performance. Unlike the carry chain of FIG. 6, CPT0 and CPT1 of FIG. 7 do not have to be dedicated to the carry chain of the macrocell. However, if the carry chain is used for logic such as a magnitude comparator and a parity tree, then the macrocell is unavailable for other logic.

Figure 8:
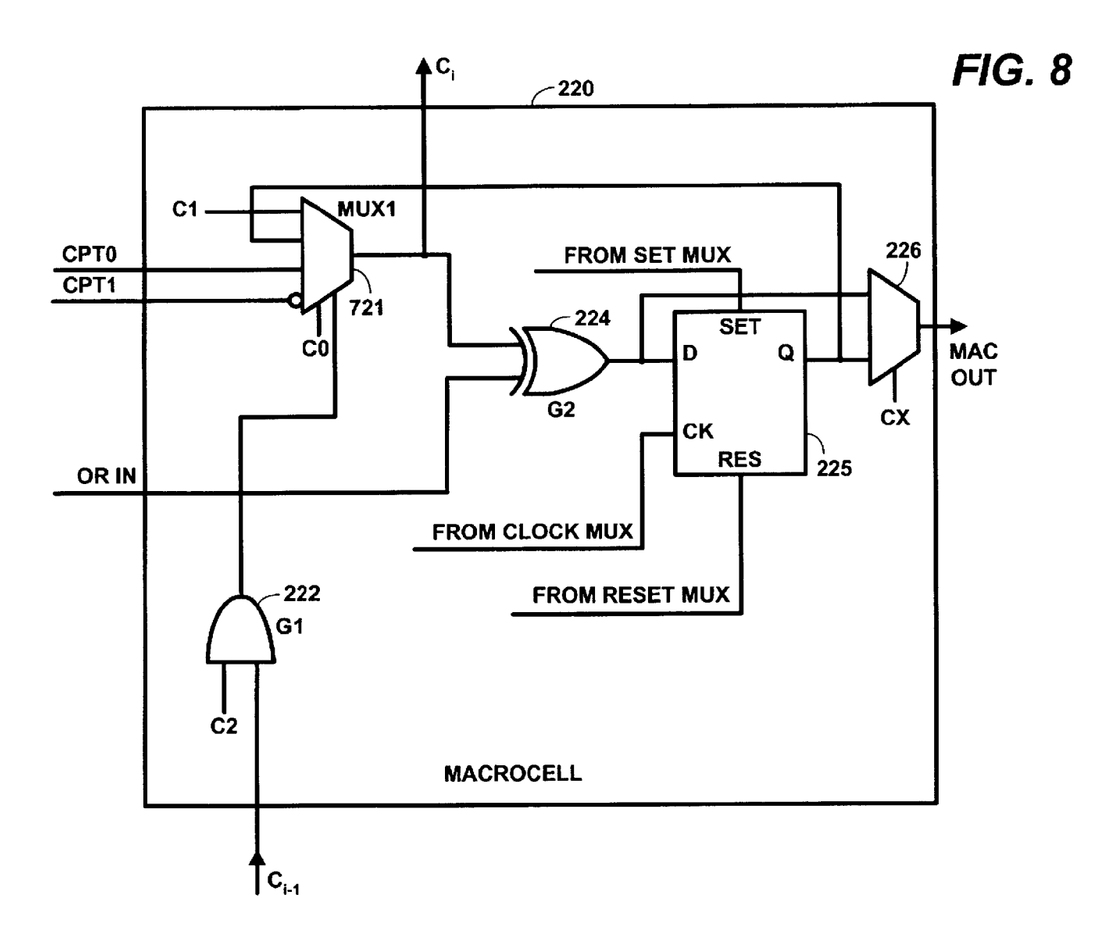
FIG. 8 shows another embodiment of the carry chain and macrocell architecture according to the present invention.

FIG. 8 shows a further embodiment of the carry chain according to the present invention. FIG. 8 is similar to FIG. 2, but for the 4-input multiplexer 721 of FIG. 7. Unlike the embodiment of FIG. 6, CPT0 and CPT1 need not be dedicated to the carry chain of the current macrocell. However, if the carry chain is used for logic such as a magnitude comparator or a parity tree, then the macrocell is unavailable for other logic.

While the foregoing detailed description has described preferred embodiments of the present invention, it is to be understood that the above description is illustrative only and not limiting of the disclosed invention. For example, other implementations of G1, G2, MUX1 and/or MUX2 may occur to those of skill in this art. Moreover, other implementations and uses for the carry chains of FIGS. 2 and 5–8 may occur to those of skill in this art, and all such modifications are deemed to fall within the scope of the present invention. Thus, the present invention is to be limited only by the claims as set forth below.

What is claimed is:

1. A circuit configured to (i) generate a carry output by selecting one of at least two product terms from a product term array, (ii) provide said carry output to an input of a first macrocell, and (iii) provide said carry output to an input of a second macrocell.

2. The circuit according to claim 1, further comprising:
   a carry generator comprising a first multiplexer of a size x:1, wherein x is at least equal to 2 and wherein a select line of said first multiplexer is coupled to an output of the first circuit.

3. The circuit according to claim 1, further comprising:
   a carry decoupler configured to select said one of at least two product terms.

4. The circuit according to claim 3, wherein said carry decoupler comprises an AND gate or a multiplexer.

5. The circuit according to claim 3, wherein said carry decoupler is configured to generate a select signal in response to a carry input and a user configurable input, wherein said select signal selects said one of at least two product terms.

6. The circuit according to claim 1, wherein said carry decoupler further comprises an XOR gate.

7. The circuit according to claim 1, further comprising:
   a second multiplexer controllable by a pair of user configurable inputs, the second multiplexer having (i) a first input coupled to a first voltage supply source, (ii) a second input coupled to an output of a register, (iii) a third input coupled to an output of the first circuit and (iv) a fourth input coupled to a second voltage supply source.

8. A method for implementing a carry chain, comprising the steps of:
   (a) generating a carry output by selecting one of at least two input product terms from a product term array;
   (b) providing said carry output to an input of a first macrocell; and
   (c) providing said carry output to an input of a second macrocell.

9. The method according to claim 8, further comprising the step of:
   repeating steps (a), (b) and (c) until a last macrocell of the chain is reached.

10. The method according to claim 8, wherein step (a) includes the sub-step of:
    converting one of the two carry product terms to a complement form.

11. The method according to claim 8, further including the step of:
    decoupling a macrocell from the chain by setting a user configurable input of the macrocell to be decoupled to a predetermined state.

12. The method according to claim 8, wherein step (a) generates a carry input term for an $i^{th}$ sum term of a 1-bit ripple carry full adder, and further comprises the sub-step of:
    generating logically ANDed $i^{th}$-1 sum operands as each of the two carry input product terms.

13. The method according to claim 12, wherein the generating step further includes a sub-step of taking a complement of one of the two logically ANDed $i^{th}$-1 sum operands.

14. The method according to claim 8, wherein step (a) generates an XOR term of an n-bit parity tree, and further comprises the step of:
    providing two same $i^{th}$ bit XOR operands as the two carry input product terms, where i is less than n-1.

15. The method according to claim 14, wherein the providing step further includes the step of taking a complement of one of the two same $i^{th}$ bit XOR operands.

16. The method according to claim 14, wherein, at a last macrocell in the parity tree, the selected carry input product term is XORed with a product term equal to a logical XOR of remaining most significant bits of the n-bit parity tree, to generate a final parity result.

17. An apparatus comprising:

means for generating a carry output by selecting one of at least two product terms from a product term array;

means for propagating the carry output to a first macrocell; and means for propagating the carry output to a second macrocell.

\* \* \* \* \*